Nov. 8, 1932.                    C. L. SMITH ET AL                        1,887,047
                              METHOD OF CONVERTING OIL
                                Filed March 22, 1928
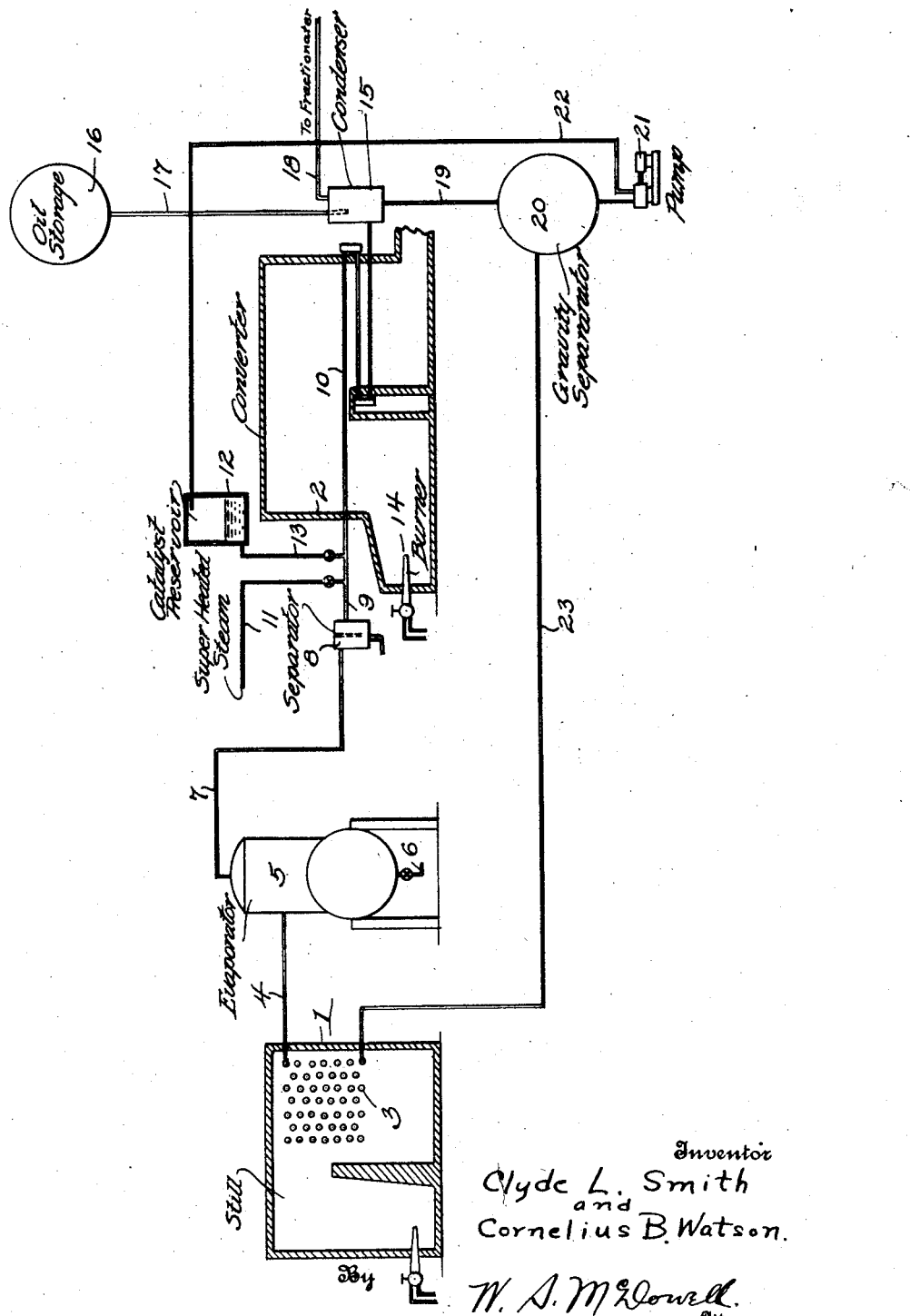
Inventor
Clyde L. Smith
and
Cornelius B. Watson.
By W. A. McDowell.
Attorney Patented Nov. 8, 1932

1,887,047

UNITED STATES PATENT OFFICE

CLYDE L. SMITH AND CORNELIUS B. WATSON, OF CHICAGO, ILLINOIS, ASSIGNORS TO THE PURE OIL COMPANY, OF CHICAGO, ILLINOIS, A CORPORATION OF OHIO

METHOD OF CONVERTING OIL

Application filed March 22, 1928. Serial No. 263,904.

This invention relates to a method of converting hydrocarbons of high boiling point into those of lower boiling point, and has particular reference to high temperature conversion systems wherein the oil while undergoing conversion is in a state of vapor.

The invention is particularly directed to a vapor phase method of oil conversion wherein the oil vapor, while in process of conversion, or under converting conditions, is in the presence of a catalytic material, and it is a primary object of the present invention to provide for a more intimate contact of the catalytic materials with the oil vapors while the latter are undergoing conversion.

Hitherto in vapor phase systems of oil conversion the catalytic material has been in the form of solid or granulated bodies. In some instances iron filings, bars, strips and the like have been employed, also nickel, zinc and the various oxides of these metals. It has also been proposed to impregnate concrete rods or bars with iron oxide, but in practically all instances the catalytic or contact materials are present stationarily during oil conversion in the form of solids. In order, therefore, to increase the catalytic activity of the particular catalyst used, the present invention resides in introducing into a moving body of heated oil vapor a catalyst in a finely divided state so that the catalyst will be circulated through the conversion zone of the system in unison with the oil vapor, coming into very intimate contact with the oil vapor to facilitate the breaking down of the more complex compounds into those of simpler form and to improve the operation generally of vapor phase systems of oil conversion where catalysts or contact materials are present. The catalysts may be introduced into the oil vapor in a finely divided state, held in suspension in a solution of requisite density or in the oil being treated.

For a further understanding of the invention reference is to be had to the following description and the accompanying drawing, wherein:

The figure designates a diagrammatic view of apparatus which may be employed in carrying out the invention.

Referring more particularly to the drawing the numeral 1 designates a pipe still or vaporizer and the numeral 2 designates the converter. The oil under process of heat treatment is first introduced into the vaporizing bank of tubes 3 situated in the pipe still 1, in which bank of tubes the oil is heated sufficiently to reduce the same to a state of mingled vapor and liquid. Usually, the temperature of the oil and oil vapor leaving the pipe still averages about 700° Fahr. From the outlet side of the pipe still a pipe line 4 leads to an evaporator 5 in which there takes place a separation of the vaporized fractions of the oil from the liquid fractions. The liquid fractions are drawn off from the bottom of the evaporator by way of the pipe line 6 and are removed from the system in the form of fuel oil. The lighter or vaporous fractions pass overhead from the evaporator and are conducted by way of a pipe line 7 to a separator 8 which operates to remove entrained liquid prior to the time the oil vapors are introduced into the high temperature unit or converter 2. From the separator a pipe line 9 leads to a bank of tubes 10 arranged within the converter unit 2, in which unit the temperature of the oil vapors is raised to a point preferably in excess of 1000° Fahr. and through which bank of tubes 10 the oil vapors pass at relatively high velocity.

Superheated steam may be introduced into the pipe line 9 by way of the steam line 11 and also introduced into the pipe line 9, ahead of the converter, is what may be generally termed a liquid catalyst. This catalyst is maintained in a drum or reservoir 12, from which leads a valve controlled pipe line 13, which enters the line 9 between the separator and the converter. As a catalyst we may employ such materials as nickel, palladium, thorium oxide, zinc oxide, or metallic iron held in solution in a finely divided state. These catalytic materials may be introduced into the heated oil vapor in several different forms. For example, the catalysts may be reduced to a finely divided state and introduced directly into the oil vapor, or while in such finely divided state may be held in suspension in a liquid solution of requisite density or in the oil being charged to the system and then introduced into the heated oil vapor. In any of these methods the catalyst thoroughly mixes with the oil vapor and circulates in unison therewith through the heated tubes of an oil converter. By reason of its physical form the catalyst is thoroughly intermingled with all parts of the oil vapor while the latter is traveling through the conversion zone and in this respect the invention is in marked contrast with previously employed systems wherein the catalyst used is maintained in a static or stationary form in the conversion zone.

The vaporizer and converter units 1 and 2 may be heated in any suitable manner such for example as by means of oil burners 14. Following circulation through the tube bank 10 the oil vapors are introduced into a jet condenser 15. The cold incoming oil stock, obtained from a tank 16 is introduced by way of a pipe line 17 into the upper part of the jet condenser in spray form. This cold incoming oil contacting with the hot oil vapors, sharply reduces the temperature of the latter to arrest the conversion reactions such, for example, as 600° F. The oil vapors pass overhead from the jet condenser and are conducted by way of a pipe line 18 to suitable fractionating and other treating mechanism. The unvaporized or liquid fractions pass from the bottom of the jet condenser by way of a pipe line 19 to a tank or drum 20. In this tank there takes place a gravity separation of the heavy oils containing the catalyst from the lighter oils, the catalyst and heavy oils collecting in the bottom of the tank 20 from which they may be removed by means of a pump 21 and forced through the pipe line 22 back to the reservoir 12. The lighter oil which accumulates in the upper part of the tank 20 is then forced or pumped by way of the pipe line 23 to the inlet side of the pipe still or vaporizer 1.

In view of the foregoing it will be seen that the present invention provides a system of oil conversion operating in the vapor phase with the employment of a catalyst. While there has been illustrated certain apparatus for carrying out the process, never-the-less, it will be understood that the invention is not limited to the specific apparatus shown and described, but that the cardinal feature of the invention resides in the employment of a catalyst which, while in a finely divided state, is introduced into the converting elements of the system so that while the oil vapors are undergoing conversion the same will be in the most intimate contact with the catalyst suspended therein. We therefore reserve the right to employ such modifications or variations of the system which may be said to fall within the scope of the following claim.

What is claimed is:

The method of converting high boiling point hydrocarbon oils into oils having lower boiling points, which comprises subjecting a continuously flowing stream of such high boiling point oil to temperatures sufficiently high to effect vaporization thereof without substantial cracking, continuously introducing into said vapors a finely divided solid catalytic material for movement in unison with said vapors, continuously passing the vapors together with the catalytic material at high velocity in a stream of restricted cross-sectional area through an elongated cracking zone wherein said vapors are heated to a temperature in excess of 1000° F. while in the presence of said catalytic material, arresting conversion reactions in the oil vapors discharged from said cracking zone by bringing said vapors into direct contact with a body of cooling oil, whereby a portion of said vapors is condensed, separating from the mixture of condensed vapors and cooling oil the catalytic materials, and separately returning to the system for passage therethrough the mixture of liquid oils and said catalyst.

In testimony whereof we affix our signatures.

CLYDE L. SMITH.
CORNELIUS B. WATSON.